United States Patent [19] [11] 3,962,913
Jeswani [45] June 15, 1976

[54] CARBURETOR CALIBRATION

[75] Inventor: Partab T. Jeswani, Rochester, N.Y.

[73] Assignee: General Motors Corporation, Detroit, Mich.

[22] Filed: June 30, 1975

[21] Appl. No.: 591,815

[52] U.S. Cl. .................................................. 73/118
[51] Int. Cl.[2] ........................................ G01M 19/00
[58] Field of Search ...................... 73/119 R, 118, 3

[56] References Cited

UNITED STATES PATENTS 2,597,231 5/1952 Edelen .......................... 73/118 UX
2,755,663 7/1956 Smith et al. .......................... 73/3 X

*Primary Examiner*—Jerry W. Myracle
*Attorney, Agent, or Firm*—Ronald L. Phillips

[57] ABSTRACT

A method of calibrating a carburetor wherein air is flowed through the mixture conduit while air is also being delivered to the fuel bowl at a predetermined rate that equates to the actual fuel flow rate required to establish a desired air-fuel ratio and the metering rod is then positioned to equalize fuel bowl pressure with ambient pressure to thereby effect proper calibration to produce the desired air-fuel ratio.

3 Claims, 1 Drawing Figure

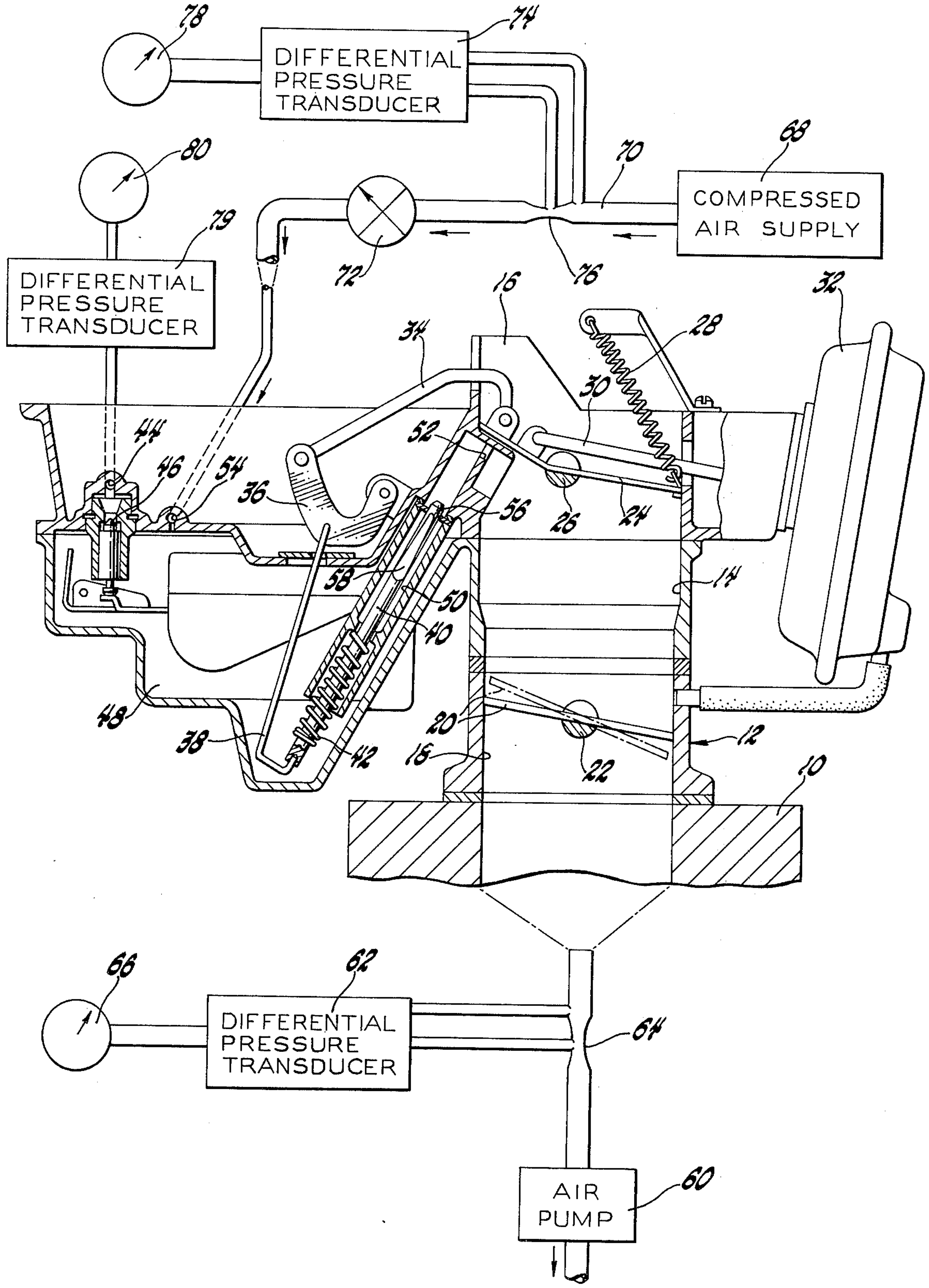
78
74
DIFFERENTIAL
PRESSURE
TRANSDUCER
80
70
68
COMPRESSED
AIR SUPPLY
79
DIFFERENTIAL
PRESSURE
TRANSDUCER
72
76
16
32
34
28
30
44
52
46
54
36
56
26
24
58
14
50
40
48
20
38
42
18
22
12
10
66
62
DIFFERENTIAL
PRESSURE
TRANSDUCER
64
AIR
PUMP
60

CARBURETOR CALIBRATION

This invention relates to carburetor calibration and more particularly to a method therefor wherein air is used as the calibration fluid.

In calibrating a carburetor prior to its assembly on an internal combustion engine, a metering rod is positioned in a jet so as to produce a predetermined amount of fluid flow therethrough. Up to now it has been common practice to use a liquid such as Stoddard solvent as the calibration fluid. However, theoretically any fluid including a gaseous fluid such as air could be used for the purpose of calibration. The use of air is particularly attractive in that it would reduce cost of materials, would produce no affect on the surrounding atmosphere and could possibly make it unnecessary for pressure and temperature controlled clean rooms for the calibration. However, in attempting to use air a major obstacle is encountered in that there should be no leakage in the supply of calibrating air to the jet since otherwise, false readings will occur.

According to the present invention there is provided a method of carburetor calibration that provides a measured calibrating air flow to the jet wherein any leakage that would give a false reading is effectively prevented without any modifications or improvement of the existing sealing in the carburetors being calibrated. This is very simply accomplished by first establishing a predetermined air flow rate through the carburetor's mixture conduit as before practiced. But then air is also supplied as a calibration fluid to the carburetor's fuel bowl at a predetermined rate that is known to equate to the actual fuel flow required to establish a predetermined air-fuel ratio in the mixture conduit. Then, it is a matter of simply adjusting the metering rod to equalize the pressure in the fuel bowl with ambient pressure to thereby effect proper calibration of the metering rod to produce the desired air-fuel ratio since with this balancing of pressures there is eliminated any pressure differential that would force leakage into or out of the system.

An object of the present invention is to provide a new and improved carburetor calibration using gaseous fluid.

Another object is to provide a new and improved method of carburetor calibration using a gaseous fluid without requiring modifications or improvements in the sealing in the carburetors.

Another object is to provide a new and improved method of carburetor calibration wherein a gaseous fluid at a measured rate is delivered to the fuel bowl and thence through the metering jet and calibration is then effected by balancing fuel bowl pressure with ambient pressure.

These and other objects and advantages of the present invention will be more apparent from the following description and drawing in which:

There is shown in a single FIGURE a schematic representation of how to practice the method according to the present invention on a carburetor of which parts are shown in elevation and parts in section.

The method of calibration according to the present invention is suited to calibrating carburetors while mounted, as is typical practice, on a flow table 10 prior to final assembly on the engine. These carburetors commonly have a fuel bowl and a metering rod which must be properly positioned in a jet to effect the carburetor's calibration so that it is ready to properly operate as installed.

The particular carburetor shown designated 12 is of the air-valve type and has a mixture conduit 14 having an air inlet 16 through which atmospheric air enters and a mixture outlet 18 which discharges the air and mixture to the engine. A throttle valve 20 is disposed in the mixture outlet 18 in the usual manner on a throttle shaft 22 while an air valve 24 is disposed in the air inlet 16 on an air valve shaft 26. A spring 28 normally urges the air valve to the closed position shown while a rod 30 links the air valve to a vacuum motor 32 which operates to open the air valve with increasing engine vacuum. The air valve 24 is linked by a rod 34, lever 36 and another rod 38, to a metering rod 40 to force upward movement of the latter against the bias of a spring 42. Fuel is normally delivered through a fuel line by a fuel pump, not shown, to a passage 44 where it is admitted on opening of a float controlled valve 46 to a fuel bowl 48. Typically, the connection of the fuel line to the carburetor is made by a threaded fitting, not shown. The metering rod 40 is disposed in a fuel passage 50 having its lower end disposed to receive fuel from a well in the bottom of the fuel bowl while the upper end of the fuel passage has an opening 52 through which fuel is discharged into the mixture conduit 14 just below the air valve 24. The space above the fuel in the fuel bowl 48 is normally open to atmosphere through one or more passages including a vapor vent passage 54. A metering jet or orifice 56 is disposed in the fuel passage around the upper tip of the metering rod. The upper tip has flat tapered surfaces 58 on opposite sides which upon reciprocation of the metering rod in the jet varies the area available for fuel flow, upward movement acting to increase the flow area and conversely downward movement acting to decrease the flow area. For further details of this particular carburetor reference may be made to copending patent application Ser. No. 343,553 filed Mar. 21, 1973 and assigned to the assignee of this invention.

To calibrate carburetors of this type it is common practice to mount them on the flow table 12, supply liquid such as Stoddard solvent to the fuel bowl through the float valve, draw air through the inlet 16 at a predetermined rate and then with the throttle valve 20 set at a certain throttle opening, adjust the metering rod 40 such as by bending the rod 34 so that there is effected a liquid flow through the jet 56 that will produce the desired air-fuel ratio.

In contrast and according to the present invention a gaseous fluid, preferably air, is used as the calibrating fluid but without leakage into or out of the calibrating air passage or system within the carburetor recognizing that any such leakage would adversely affect the calibration. As shown schematically air flow inducing means such as an air pump 60 is used to establish air flow at a predetermined flow rate into the inlet 16 and out the mixture outlet 18 of the conduit 14, this flow rate being measured by a differential pressure transducer 62 which measures the air flow rate in terms of the pressure drop through a venturi 64 and is read out on a gauge 66. And in this respect then there is no difference than if a liquid were used for calibration. But instead of a calibrating liquid, there is provided a compressed air supply 68 which supplies air through a line 70 to the fuel bowl 48 such as by easy connection of this line to the vapor vent hole 54 thereby bypassing the normal fuel inlet through the float controlled valve 46.

A constant flow controller 72 is provided in line 70 to establish a certain metered air flow to the fuel bowl which is measured by a differential pressure transducer 74. The transducer 74 measures the metered air flow rate in terms of the pressure drop through a venturi 76 in line 70 upstream of the flow controller and is read out on a gauge 78. In addition, there is provided a differential pressure transducer 79 which is readily connected to the normal fuel inlet 44 and thus to the fuel bowl 48 and measures the pressure differential between the fuel bowl and ambient and is read out on a gauge 80.

To aid in understanding this new method of calibration it is important to understand that if air were supplied to the fuel bowl and the air pressure developed therein rose substantially above ambient pressure there would probably be leakage of this air forced by the pressure differential out through one or more of the possible leakage paths in the carburetor including the sealed joints recognizing that they are designed to seal against liquid not air loss. On the other hand, the depression at the jet resulting from air flow through the mixing conduit causes lower pressures in the fuel bowl tending to force ambient air to leak into the fuel bowl. In arriving at the present invention it was recognized that if pressure in the fuel bowl was balanced with ambient pressure wherein the depression of the jet is offset by the pressure supplied to the fuel bowl there would then be no pressure differential forcing air into or out of the fuel bowl past any of the possible leakage areas. As a result, accurate calibration with air could then be provided and without any special sealing in the carburetor against air leakage.

Proceeding now with the new method of calibration using air as the calibration fluid, the throttle valve is set at a prescribed opening as shown by the dash-line position and the air pump 60 is operated to effect a certain air flow through the mixture conduit 14 at this throttle angle, this air flow being read at gauge 66. Compressed air from the air supply 68 is then delivered at a regulated or constant rate by the constant flow controller 72 to the fuel bowl 48 through the vapor vent hole 54. The constant flow controller 72 thus determines the amount of air going into the bowl and this is set according to the air flow through the mixture conduit as will be described in more detail later. The air flow through the mixture conduit 14 causes depression at the metering jet 56 which in turn causes the calibration air delivered to the fuel bowl to then flow through the jet. If more air is then being injected into the fuel bowl than flows through the jet, the pressure in the fuel bowl will build to a positive value as read on gauge 80 and the calibration air is prone to leak out. On the other hand, a low supply of calibration air can result in a negative pressure in the fuel bowl as read on gauge 80 and ambient air is prone to leak in and add to the calibration air.

In the method of calibration according to the present invention the constant flow controller 72 is set or adjusted to establish the flow of the calibration air to the fuel bowl at a predetermined rate the equates to the actual fuel flow required out the jet and into the mixture conduit to establish the desired air-fuel ratio given the particular air flow through the mixing conduit 14 read at gauge 66 for this throttle setting. With this condition set the metering rod 40 is then simply adjusted in the jet 56 such as by bending the rod 34 to produce a flow of the calibration air through the jet that equalizes the pressure in the fuel bowl with ambient pressure and would read out as zero on the gauge 80. With the fuel bowl pressure balanced with atmosphere all of the measured calibration air is assuredly passing through the jet, i.e., is not affected by any leakage, and thus the carburetor is accurately calibrated. Furthermore, since the calibration air bypasses the float system its flow in the carburetor becomes readily stable thereby reducing the calibration time. Of course, the method of calibration is readily suitable to other types of carburetors with other means of adjustment of the metering rod or valve which for example could be by simple adjustment of a screw or nut rather than bending a rod.

The above described embodiment is illustrative of the invention which may be modified within the scope of the appended claims.

I claim:

1. A method of calibrating a carburetor wherein a metering rod is to be positioned in a fuel jet to provide a predetermined fuel flow rate from the carburetor's fuel bowl to the carburetor's mixture conduit comprising the steps of (1) establishing an air flow through the mixture conduit, and (2) supplying air as a calibration fluid to the fuel bowl at a measured flow rate that is sufficient at a particular metering rod setting to offset the depression of the jet to balance fuel bowl pressure with ambient pressure.

2. A method of calibrating a carburetor wherein a metering rod is to be positioned in a fuel jet to provide a predetermined fuel flow rate from the carburetor's fuel bowl to the carburetor's mixture conduit comprising the steps of (1) establishing an air flow through the mixture conduit, (2) supplying air as a calibration fluid to the fuel bowl at a predetermined rate that equates to the actual fuel flow rate required to establish a predetermined air-fuel ratio in the mixture conduit, and (3) adjusting the metering rod to equalize the pressure in the fuel bowl with ambient pressure to thereby effect proper calibration of the metering rod to produce the desired air-fuel ratio.

3. A method of calibrating a carburetor wherein a metering rod is to be positioned in a fuel jet to provide a predetermined fuel flow rate from the carburetor's fuel bowl to the carburetor's mixture conduit and wherein vapors in the fuel bowl are normally vented through a vapor vent hole comprising the steps of (1) establishing an air flow through the mixture conduit, (2) supplying air as a calibration fluid to the fuel bowl through the vapor vent hole at a predetermined rate that equates to the actual fuel flow rate required to establish a predetermined air-fuel ratio in the mixture conduit, and (3) adjusting the metering rod to equalize the pressure in the fuel bowl with ambient pressure to thereby effect proper calibration of the metering rod to produce the desired air-fuel ratio.

* * * * *